United States Patent
Morimoto et al.

(10) Patent No.: US 12,334,766 B2
(45) Date of Patent: Jun. 17, 2025

(54) PACK BATTERY CHARGING METHOD, PACK BATTERY, AND POWER SOURCE DEVICE

(71) Applicant: SANYO Electric Co., Ltd., Osaka (JP)

(72) Inventors: Tsuyoshi Morimoto, Osaka (JP); Tomomi Kaino, Osaka (JP); Toru Nishikawa, Osaka (JP); Naoto Matsuda, Osaka (JP); Takanori Harada, Osaka (JP)

(73) Assignee: PANASONIC ENERGY CO., LTD., Moriguchi (JP)

( * ) Notice: Subject to any disclaimer, the term of this patent is extended or adjusted under 35 U.S.C. 154(b) by 878 days.

(21) Appl. No.: 17/429,327

(22) PCT Filed: Feb. 18, 2020

(86) PCT No.: PCT/JP2020/006227
§ 371 (c)(1),
(2) Date: Aug. 6, 2021

(87) PCT Pub. No.: WO2020/175233
PCT Pub. Date: Sep. 3, 2020

(65) Prior Publication Data
US 2022/0109195 A1    Apr. 7, 2022

(30) Foreign Application Priority Data
Feb. 27, 2019   (JP) ................. 2019-033809

(51) Int. Cl.
*H02J 7/00*    (2006.01)
*H01M 10/44*   (2006.01)
*H01M 10/48*   (2006.01)

(52) U.S. Cl.
CPC ............ *H02J 7/005* (2020.01); *H01M 10/44* (2013.01); *H01M 10/48* (2013.01);
(Continued)

(58) Field of Classification Search
CPC ...................................... H02J 7/005
(Continued)

(56) References Cited

U.S. PATENT DOCUMENTS 12,132,339 B2 *  10/2024  Ghantous .............. H02J 7/0048
2008/0224667 A1   9/2008  Tanaka et al.
(Continued)

FOREIGN PATENT DOCUMENTS

JP    10-145981     5/1998
JP    2010-016976   1/2010
(Continued)

OTHER PUBLICATIONS

International Search Report of PCT application No. PCT/JP2020/006227 dated Mar. 24, 2020.
(Continued)

*Primary Examiner* — Eric D Lee
(74) *Attorney, Agent, or Firm* — WHDA, LLP

(57) ABSTRACT

A pack battery charging method is a charging method for connecting pack battery to charger and charging pack battery at a constant voltage and a constant current. Pack battery detects a degree of deterioration of battery and a supply voltage at which charger charges pack battery, and specifies a charging termination current from both the supply voltage of charger and the degree of deterioration of battery to perform charging.

13 Claims, 3 Drawing Sheets

(52) U.S. Cl.
CPC ........ *H02J 7/00302* (2020.01); *H02J 7/0031* (2013.01); *H02J 7/007* (2013.01); *H02J 7/007182* (2020.01)

(58) Field of Classification Search
USPC ........................................................ 320/134
See application file for complete search history.

(56) References Cited

U.S. PATENT DOCUMENTS

| | | | |
|---|---|---|---|
| 2011/0199059 A1 | 8/2011 | Aradachi et al. | |
| 2015/0377976 A1* | 12/2015 | Maluf | G01R 31/392 |
| | | | 702/63 |

FOREIGN PATENT DOCUMENTS

| | | |
|---|---|---|
| JP | 2010-081683 | 4/2010 |
| WO | 2010/002040 | 1/2010 |

OTHER PUBLICATIONS

English Translation of CN Office Action dated Mar. 19, 2024 issued in counterpart Application No. 202080014081.4. (5 pages).

\* cited by examiner

FIG. 3

| | Charging voltage [V/cell] | Degree of deterioration 0 | Degree of deterioration 1 | Degree of deterioration 2 | Degree of deterioration 3 | Degree of deterioration 4 | Degree of deterioration 5 |
|---|---|---|---|---|---|---|---|
| 1 | 4.23 ~ | Full charging is detected at detection of maximum cell voltage of 4.23 V or more ||||||
| 2 | 4.22 ~ 4.23 | 230mA | 300mA | 360mA | 460mA | 540mA | 620mA |
| 3 | 4.21 ~ 4.22 | 155mA | 230mA | 290mA | 370mA | 460mA | 540mA |
| 4 | 4.20 ~ 4.21 | 95mA | 155mA | 210mA | 300mA | 380mA | 450mA |
| 5 | 4.19 ~ 4.20 | 45mA | 95mA | 155mA | 235mA | 310mA | 380mA |
| 6 | 4.18 ~ 4.19 | 45mA | 45mA | 95mA | 170mA | 240mA | 310mA |
| 7 | 4.17 ~ 4.18 | 45mA | 45mA | 45mA | 110mA | 175mA | 240mA |
| 8 | 4.16 ~ 4.17 | 45mA | 45mA | 45mA | 45mA | 110mA | 170mA |
| 9 | 4.15 ~ 4.16 | 45mA | 45mA | 45mA | 45mA | 45mA | 100mA |
| 10 | 4.14 ~ 4.15 | 45mA | 45mA | 45mA | 45mA | 45mA | 45mA |

PACK BATTERY CHARGING METHOD, PACK BATTERY, AND POWER SOURCE DEVICE

CROSS-REFERENCE TO RELATED APPLICATIONS

This application is a U.S. national stage application of the PCT International Application No. PCT/JP2020/006227 filed on Feb. 18, 2020, which claims the benefit of foreign priority of Japanese patent application No. 2019-033809 filed on Feb. 27, 2019, the contents all of which are incorporated herein by reference.

TECHNICAL FIELD

The present invention relates to a pack battery charging method for connecting a pack battery to a charger to perform charging, a pack battery, and a power source device including the pack battery and the charger, and particularly relates to a method for charging a pack battery incorporating a lithium ion secondary battery, a pack battery, and a power source device.

BACKGROUND ART

A non-aqueous electrolyte secondary battery such as a lithium ion secondary battery is fully charged by constant-voltage and constant-current charging. In the constant-voltage and constant-current charging, the battery is charged at a constant current until the voltage of the charging battery rises to a preset voltage, for example, 4.2 V/cell, and after the voltage rises to the set voltage, the battery is fully charged by constant-voltage charging. Since the current of the battery charged at a constant voltage gradually decreases, when the charging current decreases to a preset charging termination current, it is determined that the battery is fully charged, and the charging is terminated. The charging termination current can be set to be small, in other words, the charging time can be extended to increase the capacity to be charged into the battery. However, decreasing the charging termination current to increase the charging amount of the battery leads to increasing deterioration of the battery to shorten its life.

In order to prevent the above adverse effects, a pack battery that determines a charging termination current in consideration of the temperature and internal resistance of the battery has been developed (see PTL 1).

Since the internal resistance increases as the battery deteriorates, in the method of changing the charging termination current with the internal resistance, as the battery deteriorates and the internal resistance increases, the charging termination current of the battery is increased, and the capacity for charging the battery is gradually reduced, so that deterioration of the battery can be reduced.

CITATION LIST

Patent Literature

PTL 1: Unexamined Japanese Patent Publication No. 10-145981

SUMMARY OF THE INVENTION

As described in PTL 1, in a pack battery that terminates charging by increasing a charging termination current of a battery that has deteriorated and has increased internal resistance, the degree of deterioration of the battery is reduced, and charging can be terminated particularly in a state of suppressing deterioration of a battery that has deteriorated. However, when a pack battery used for a power source of an electronic device, particularly a pack battery including a battery progressed in deterioration, is charged by being connected to a charger with a high output voltage, in other words, a charger with a high charging voltage for charging the battery, even if the charging termination current is changed in accordance with the degree of deterioration of the battery, the charged capacity increases and the battery is charged to a state progressed in deterioration, and the charging and discharging cycle life is shortened. Conversely, when a pack battery including a battery progressed in deterioration is charged by a charger with a low output voltage, there is a disadvantage that the capacity to be substantially charged is reduced, and the time available to the user is shortened.

The present invention has been developed for the purpose of further solving the above adverse effects, and an object of the present invention is to provide a pack battery charging method, a pack battery, and a power source device that can charge the battery to an ideal capacity and prolong the charging and discharging cycle life of the battery.

A pack battery charging method according to an aspect of the present invention is a charging method for connecting pack battery 10 to charger 20 and charging pack battery 10 at a constant voltage and a constant current, the method including: detecting, by pack battery 10, a degree of deterioration of battery 11 and a supply voltage at which charger 20 charges pack battery 10; and specifying, by pack battery 10, a charging termination current from both the supply voltage of charger 20 and the degree of deterioration of battery 11 to charge battery 11.

A pack battery according to another aspect of the present invention is a pack battery connected to charger 20 and charged at a constant voltage and a constant current, the pack battery including: detection circuit 12 that detects a charging voltage from charger 20 and a degree of deterioration of battery 11; arithmetic circuit 13 that calculates a charging termination current from the charging voltage and the degree of deterioration detected by detection circuit 12; and signal terminal 17 that detects the charging termination current calculated by arithmetic circuit 13 and outputs a charging stop signal to charger 20.

A power source device according to another aspect of the present invention includes charger 20 and pack battery 10 connected to charger 20 and charged at a constant voltage and a constant current. Pack battery 10 includes detection circuit 12 that detects a charging voltage from charger 20 and a degree of deterioration of battery 11, arithmetic circuit 13 that calculates a charging termination current from the charging voltage and the degree of deterioration detected by detection circuit 12, and signal terminal 17 that detects the charging termination current calculated by arithmetic circuit 13 and outputs a charging stop signal to charger 20. Charger 20 includes charging stop circuit 22 that is connected to signal terminal 17 and stops charging of pack battery 10 with the charging stop signal input from signal terminal 17.

The present invention is characterized in that while charging a deteriorated battery to an ideal capacity to prolong a use time of a user, deterioration of the charged battery is suppressed to a minimum, and a charging and discharging cycle life can be prolonged.

BRIEF DESCRIPTION OF DRAWINGS

FIG. 3 is a table showing an example of a look-up table for specifying a charging termination current from a degree of deterioration of a battery and a charging voltage.

DESCRIPTION OF EMBODIMENT

Figure 1:
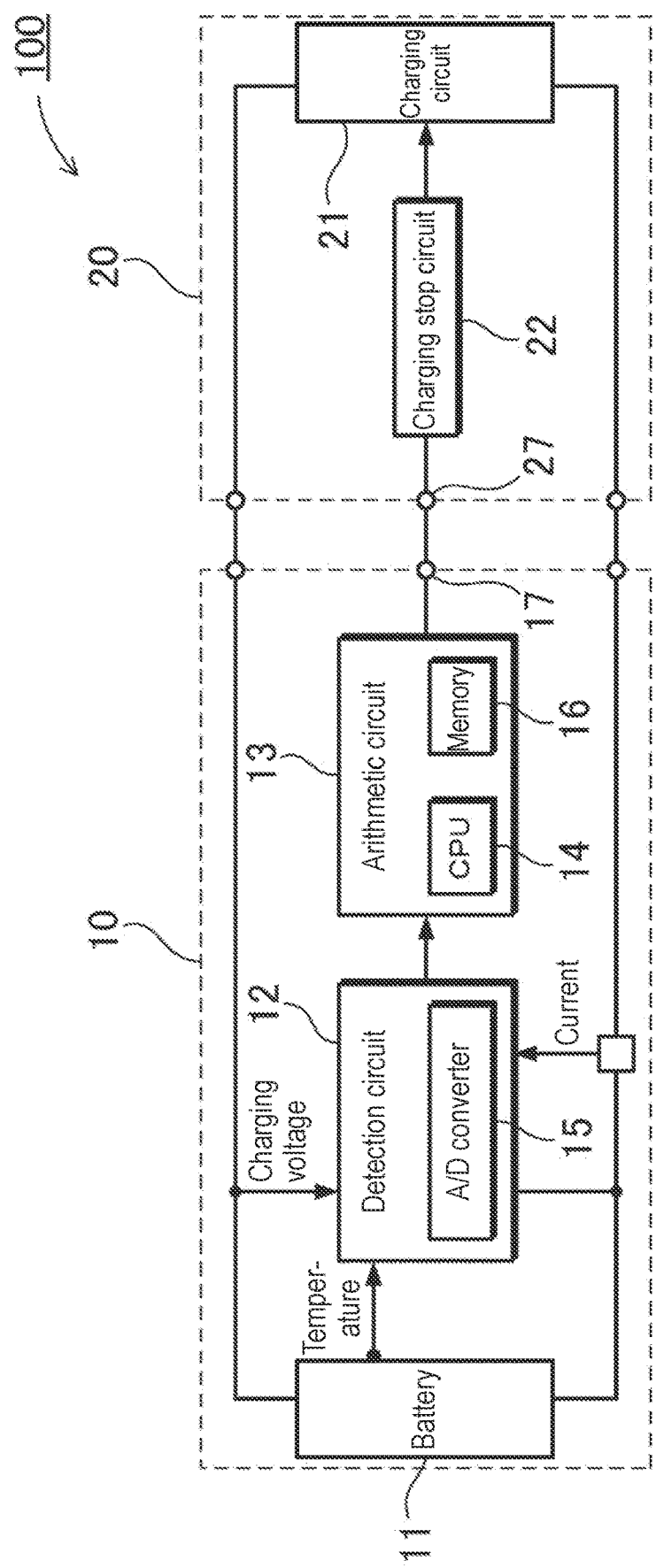
FIG. 1 is a block diagram of a power source device including a pack battery and a charger according to an embodiment of the present invention.

Hereinafter, the present invention will be described in detail with reference to the drawings. In the following description, terms (for example, "upper", "lower", and other terms including those terms) indicating specific directions and positions are used as necessary, but these terms are used to facilitate understanding of the invention with reference to the drawings, and the technical scope of the present invention is not limited by the meanings of these terms. Parts denoted by the same reference numerals in a plurality of drawings indicate the same or equivalent parts or members.

Further, the following exemplary embodiment illustrates a specific example of the technical idea of the present invention, and does not limit the present invention to the following. In addition, unless otherwise specified, dimensions, materials, shapes, relative arrangement, and the like of the components described below are not intended to limit the scope of the present invention, but are intended to be illustrative. The contents described in one exemplary embodiment and example are also applicable to other exemplary embodiments and examples. In addition, sizes, positional relationships, and the like of members illustrated in the drawings may be exaggerated for clarity of description.

A pack battery charging method according to a first embodiment of the present invention is a charging method for connecting a pack battery to a charger and charging the pack battery at a constant voltage and a constant current, in which the pack battery detects a degree of deterioration of the battery and a supply voltage at which the charger charges the pack battery, and specifies a charging termination current from both the supply voltage of the charger and the degree of deterioration of the battery to charge the battery.

The charging method described above is characterized in that, while the deteriorated battery is connected to a charger having different charging voltages, the battery is always charged to a capacity optimal for the degree of deterioration of the battery, and the use time of the user can be extended, and moreover, the deterioration of the battery in the charged state is suppressed to a minimum, and the charging and discharging cycle life can be prolonged. This is because the charging method described above detects the degree of deterioration of the battery and the supply voltage at which the charger charges the pack battery, specifies the charging termination current based on both the supply voltage of the charger and the degree of deterioration of the battery, and terminates the charging. In the constant-voltage and constant-current charging, constant-current charging is performed in a state where the battery voltage is lower than the set voltage, and after the battery voltage rises to the set voltage, charging is performed by controlling the battery voltage of the battery not to be higher than the set voltage. In a battery charged at a constant voltage, the battery voltage gradually increases, and the charging current gradually decreases. Therefore, when the charging current decreases to a charging termination current, the charging is terminated. A battery has a characteristic that a degree of deterioration varies depending on a remaining capacity, and deterioration increases in a fully charged state. The deterioration of the battery can be suppressed by reducing the capacity to be charged, but the battery having a small charging capacity has a disadvantage that the use time of the user is shortened. Therefore, it is important to maximize the use time of the user while suppressing deterioration of the battery as much as possible. As the battery deteriorates, the capacity to be charged can be reduced to reduce the progress of deterioration, and safety can also be secured. However, for the battery, the suppression of deterioration and the lengthening of the use time of the user are mutually contradictory characteristics, and it is difficult to satisfy both of them, and it is important to control both of them to an optimum state. The charging capacity of the battery can be adjusted by a charging termination current, and the charging capacity can be increased by lowering the charging termination current and charging for a long time, and conversely, the charging capacity can be reduced by increasing the charging termination current and shortening the charging time of the battery. Furthermore, even if the charging termination current is set to the same current value, the charging capacity also changes depending on the charging voltage of the battery. When the charging voltage is high, the charging capacity is large even if the charging termination current is set to the same value, and conversely, when the charging voltage of the battery decreases, the capacity to be charged decreases even if the charging termination current is the same. Therefore, even if the battery is charged by setting the charging termination current to the same current value, if the charging voltage is high, the deteriorated battery has a large charging capacity and is greatly deteriorated in a charged state, and conversely, if the charging voltage is low, there is an adverse effect that the charging capacity decreases and the use time of the user is shortened.

In the charging method described above, in addition to controlling the charging capacity by adjusting the charging termination current in accordance with the degree of deterioration of the battery, the charging termination current is set to an optimum value based on both the degree of deterioration and the charging current in consideration of the charging voltage. Therefore, it is possible to perform charging in a positively ideal state in which the deterioration of the battery in the charged state can be minimized and the charging and discharging cycle life can be prolonged while charging the deteriorated battery to a state in which the user can use the battery at the maximum.

Further, in the above charging method, the pack battery can be connected to a plurality of chargers having different charging voltages, and deterioration can be suppressed to a minimum while charging to an ideal capacity, so that both an old type charger and a new type charger having different charging voltages can be used for charging. Therefore, there is a feature that a user can conveniently use a pack battery by using a plurality of chargers, and can charge the battery to an ideal capacity while minimizing deterioration of the battery while charging with both chargers. For this reason, there is a feature that it is possible to safely increase the charging capacity while suppressing the deterioration of the pack battery to the minimum and to prolong the time during which the user can use the pack battery as the power source of the electronic device.

A pack battery charging method according to a second embodiment of the present invention increases the charging termination current as the degree of deterioration of the battery included in the pack battery increases, and further increases the charging termination current as the supply voltage increases.

In the charging method described above, as the degree of deterioration of the battery increases, the charging time is shortened by increasing the charging termination current, and further, as the charging voltage of the battery increases, the charging time of the battery is shortened by increasing the charging termination current, so that the charging capacity of the deteriorated battery can be reduced to minimize the deterioration of the battery in the fully charged state.

In a pack battery charging method according to a third embodiment of the present invention, the pack battery stores a charging termination current with respect to a degree of deterioration of the battery and a supply voltage in a look-up table, and specifies the charging termination current from the degree of deterioration of the battery and the supply voltage of a charger in accordance with the storage of the look-up table.

In a pack battery charging method according to a fourth embodiment of the present invention, the pack battery stores a function for specifying a charging termination current from the degree of deterioration of the battery and the supply voltage, and specifies the charging termination current from the degree of deterioration of the battery and the supply voltage of the charger based on the function.

In a pack battery charging method according to a fifth embodiment of the present invention, the pack battery incorporates a lithium ion secondary battery.

A pack battery according to a sixth embodiment of the present invention is a pack battery that is connected to a charger and is charged at a constant voltage and a constant current, and includes a detection circuit that detects a charging voltage from the charger and a degree of deterioration of the battery, an arithmetic circuit that calculates a charging termination current from the charging voltage and the degree of deterioration detected by the detection circuit, and a signal terminal that detects the charging termination current calculated by the arithmetic circuit and outputs a charging stop signal to the charger.

The pack battery described above is characterized in that, even when the pack battery is charged by a charger having a different charging voltage, the pack battery is charged to a capacity optimum for the degree of deterioration, and the use time of the user can be extended, and moreover, the pack battery can be minimized in deterioration in a charged state, and the charging and discharging cycle life can be prolonged. This is because the pack battery described above detects the degree of deterioration of the battery and the supply voltage at which the charger charges the pack battery, specifies the charging termination current based on both the supply voltage of the charger and the degree of deterioration of the battery, and terminates charging. It is important to maximize the use time of the user while suppressing the deterioration of the pack battery as much as possible. The pack battery described above is charged in a positively ideal state in which deterioration of the battery in a charged state can be suppressed to a minimum and a charging and discharging cycle life can be prolonged while charging the deteriorated battery to a state in which the user can use the battery at a maximum.

In a pack battery according to a seventh embodiment of the present invention, the arithmetic circuit includes a memory that stores a look-up table for specifying a charging termination current from the degree of deterioration of the battery and the supply voltage of the charger, and specifies the charging termination current from the degree of deterioration of the battery and the supply voltage of the charger based on the look-up table stored in the memory.

In a pack battery according to an eighth embodiment of the present invention, the arithmetic circuit includes a memory that stores a function for specifying a charging termination current from the degree of deterioration of the battery and the supply voltage of the charger, and specifies the charging termination current from the degree of deterioration of the battery and the supply voltage of the charger based on the function stored in the memory.

A pack battery according to a ninth embodiment of the present invention incorporates a lithium ion secondary battery.

A power source device according to a tenth embodiment of the present invention includes a charger and a pack battery connected to the charger and charged at a constant voltage and a constant current. The pack battery includes a detection circuit that detects a charging voltage from the charger and a degree of deterioration of the battery, an arithmetic circuit that calculates a charging termination current from the charging voltage and the degree of deterioration detected by the detection circuit, and a signal terminal that detects the charging termination current calculated by the arithmetic circuit and outputs a charging stop signal to the charger. The charger includes a charging stop circuit that is connected to the signal terminal and stops charging of the pack battery with the charging stop signal input from the signal terminal.

The power source device described above is characterized in that, even when the pack battery is charged by a charger having different charging voltages, the battery is charged to a capacity optimum for the degree of deterioration of the battery, and the use time of the pack battery can be extended, and moreover, the deterioration of the pack battery in a charged state is suppressed to a minimum, and the charging and discharging cycle life can be prolonged. This is because the power source device detects the degree of deterioration of the battery included in the pack battery and the supply voltage at which the charger charges the power source device, specifies the charging termination current based on both the supply voltage of the charger and the degree of deterioration of the battery included in the pack battery, and terminates charging. It is important to maximize the use time of the user while suppressing the deterioration of the pack battery as much as possible. However, the power source device described above can use the deteriorated pack battery in a positively ideal state in which the deterioration of the charged pack battery can be minimized to prolong the charging and discharging cycle life while charging the battery to a state in which the user can use the battery to the maximum.

In a power source device according to an eleventh embodiment of the present invention, an arithmetic circuit includes a memory that stores a look-up table for specifying a charging termination current from a degree of deterioration of a battery and a supply voltage of a charger, and specifies the charging termination current from the degree of deterioration of the battery and the supply voltage of the charger based on the look-up table stored in the memory.

In a power source device according to a twelfth embodiment of the present invention, an arithmetic circuit includes a memory that stores a function for specifying a charging termination current from a degree of deterioration of a battery and a supply voltage of a charger, and specifies the charging termination current from the degree of deterioration of the battery and the supply voltage of the charger based on the function stored in the memory.

In a power source device according to a thirteenth embodiment of the present invention, a pack battery incorporates a lithium ion secondary battery.

First Exemplary Embodiment

Power source device 100 of FIG. 1 includes charger 20 and pack battery 10 connected to charger 20 and charged at a constant voltage and a constant current. Pack battery 10 includes detection circuit 12 that detects the charging voltage from charger 20 and the degree of deterioration of battery 11, arithmetic circuit 13 that calculates a charging termination current from the charging voltage and the degree of deterioration detected by detection circuit 12, and signal terminal 17 that detects the charging termination current calculated by arithmetic circuit 13 and outputs a charging stop signal to charger 20.

Figure 2:
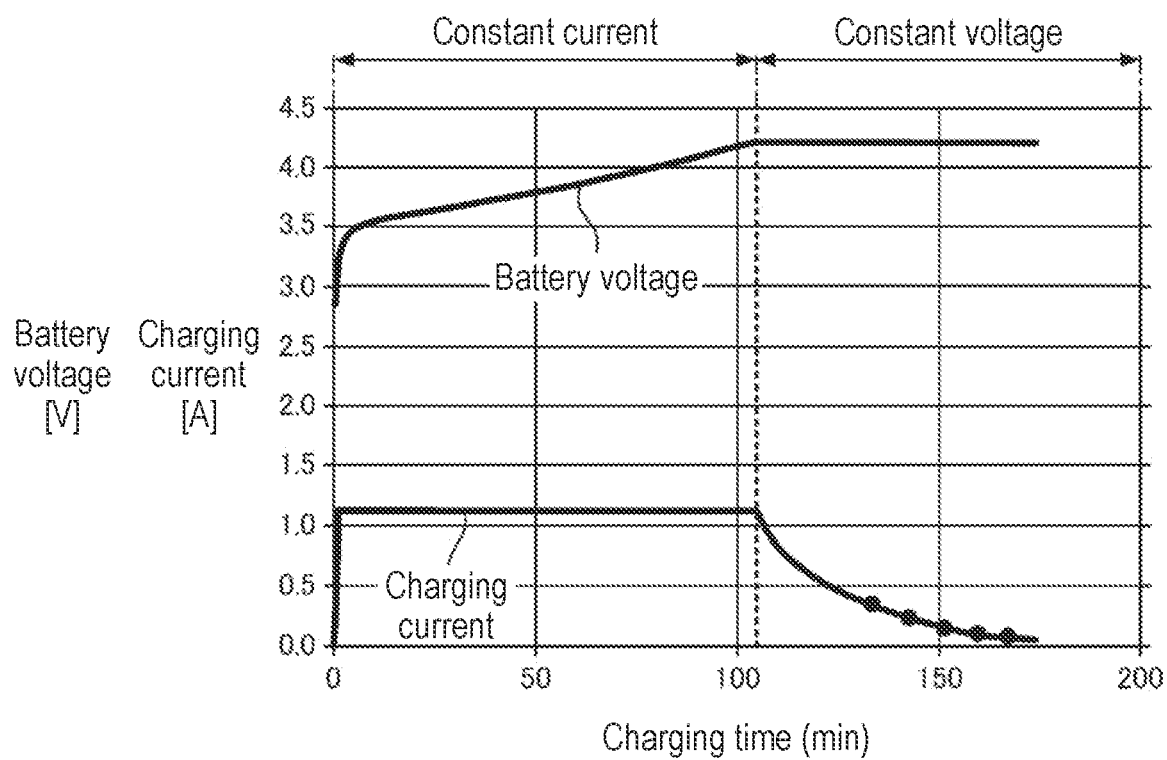
FIG. 2 is a graph showing an example of characteristics in which a charger charges a pack battery at a constant voltage and a constant current.

Charger 20 includes charging stop circuit 22 that is connected to signal terminal 17 of pack battery 10 and stops charging of pack battery 10 with a charging stop signal input from signal terminal 17. Charger 20 includes charging circuit 21 for charging pack battery 10 at a constant voltage and a constant current. FIG. 2 shows an example of characteristics of charging circuit 21 charging pack battery 10 at a constant voltage and a constant current. In this drawing, a horizontal axis represents time, and a vertical axis represents a charging current and a charging voltage. In this drawing, charging circuit 21 limits the charging voltage of pack battery 10 to a constant voltage or less, and limits the charging current to a constant current or less to perform charging. Since the voltage of pack battery 10 is lower than the charging voltage in a state where charging is started, constant-current charging is performed with a constant current. When the constant-current charging is performed and the battery voltage rises to the charging voltage, the charging is performed by switching to constant-voltage charging such that the battery voltage does not rise. Since the charging current of pack battery 10 charged at a constant voltage gradually decreases, charging circuit 21 stops charging when the charging current decreases to a charging termination current. The charging termination current is calculated by pack battery 10 from the degree of deterioration of battery 11 and the charging voltage. Pack battery 10 calculates a degree of deterioration of battery 11 in order to calculate a charging termination current, and further detects a charging voltage. Pack battery 10 transmits the calculated charging termination current to charging circuit 21. Charging circuit 21 stops charging with a charging termination current transmitted from pack battery 10. However, when charging circuit 21 cannot normally stop charging, charging is stopped by a switching element (not shown) provided in pack battery 10.

Charger 20 of pack battery 10 in which battery 11 is a lithium ion secondary battery performs charging at a charging voltage of, for example, 4.2 V/cell and a charging current corresponding to the capacity of battery 11, for example, at a charging current of 0.5 C to 10 C, preferably 0.5 C to 3 C, and more preferably about 1 C. Charging circuit 21 of pack battery 10 in which the two lithium ion secondary batteries are connected in series performs charging at a charging voltage of 8.4 V. When the charging termination signal is input from pack battery 10, charger 20 sets the charging voltage of battery 11 to 0 V and terminates the charging. Charger 20 has signal terminal 27 for inputting a charging termination signal from pack battery 10, and this signal terminal 27 is connected to signal terminal 17 of pack battery 10.

Pack battery 10 also includes detection circuit 12 that detects the degree of deterioration of the battery and the charging voltage, and central processing unit (CPU) 14 that calculates a charging termination current from the parameters detected by detection circuit 12. Detection circuit 12 detects the internal resistance of battery 11, a number of times of charging and discharging, the charged and discharged current, the environmental temperature, and the like, and calculates the degree of deterioration of battery 11. Since battery 11 deteriorates when the number of times of charging and discharging increases, the integrated value of the charged and discharged currents increases, and the environmental temperature becomes higher or lower than a set value, it is possible to determine the degree of deterioration by detecting such values. Furthermore, since the internal resistance increases when battery 11 deteriorates, the degree of deterioration of battery 11 can be calculated from the above parameters and internal resistance.

Further, detection circuit 12 includes A/D converter 15 for detecting a charging voltage of pack battery 10 and converting the charging voltage into a digital signal. Detection circuit 12 detects the charging voltage in a state where pack battery 10 is connected to charger 20. Arithmetic circuit 13 can detect the charging voltage by disconnecting pack battery 10 from charging circuit 21 while pack battery 10 is set in charger 20. Since pack battery 10 incorporates a charging switch (not shown) connected in series with battery 11, it is possible to detect the charging voltage by setting this charging switch (not shown) to the off-state, and disconnecting battery 11 from charging circuit 21. The charging voltage is converted into a digital signal by A/D converter 15 and input to CPU 14. The charging switch is switched to the on-state in a state of charging pack battery 10.

CPU 14 calculates a charging termination current from the battery voltage detected by detection circuit 12 and the degree of deterioration of battery 11. Data specifying the charging termination current from the battery voltage and the degree of deterioration is stored in memory 16 of pack battery 10 as a look-up table. However, the pack battery can also store data specifying the charging termination current from the battery voltage and the degree of deterioration as a function in memory 16 without necessarily storing the data as a look-up table. CPU 14 calculates a charging termination current from the battery voltage and the degree of deterioration based on the look-up table or the function stored in memory 16.

CPU 14 increases the charging termination current as the degree of deterioration of battery 11 increases, and increases the charging termination current as the supply voltage increases. That is, as the degree of deterioration of the battery increases and the charging voltage of charger 20 increases, CPU 14 sets the charging termination current to be large, and gradually reduces the capacity to charge battery 11, thereby suppressing the deterioration of battery 11. This is because when deteriorated battery 11 is charged at a high charging voltage, the charging capacity increases and the deterioration becomes severe. CPU 14 increases the charging termination current to shorten the charging time as the degree of deterioration of battery 11 increases, and further increases the charging termination current as the charging voltage of battery 11 increases to shorten the charging time of battery 11, thereby limiting the charging capacity of the deteriorated battery to be small, and minimizing the deterioration of battery 11 in the fully charged state.

FIG. 3 illustrates a specific example of a look-up table for specifying a charging termination current from a charging voltage and a degree of deterioration. In the look-up table of this drawing, the degree of deterioration of battery 11 is specified in six stages of degrees of deterioration 0 to 5 as the deterioration progresses, and the charging voltage is specified in 10 stages from 4.23 V/cell or more to 4.14 to 4.15 V. Pack battery 10 charged by charger 20 whose charging voltage is 4.23 V or higher stops charging when the battery voltage rises to 4.23 V, that is, when the constant-current charging terminates. In pack battery 10 charged by charger 20 at a charging voltage of 4.22 V to 4.23 V, the charging termination current is set to 230 mA in the state of the degree of deterioration 0, and is set to 620 mA in the state of the degree of deterioration 5 to suppress the deterioration in the charged state.

INDUSTRIAL APPLICABILITY

The present invention can be effectively used as a pack battery optimal for charging with a plurality of chargers having different output voltages.

REFERENCE MARKS IN THE DRAWINGS

100 power source device
10 pack battery
11 battery
12 detection circuit
13 arithmetic circuit
14 CPU
15 A/D converter
16 memory
17 signal terminal
20 charger
21 charging circuit
22 charging stop circuit
27 signal terminal

The invention claimed is:
1. A pack battery charging method for connecting a pack battery to a charger and charging the pack battery by switching from constant-current charging to constant-voltage charging, the method comprising:
  detecting, by the pack battery, a degree of deterioration of a battery and a charging voltage at which the charger charges the pack battery;
  determining a charging termination current based on both a supply voltage of the charger and the degree of deterioration of the battery for terminating charging of the pack battery during the constant-voltage charging; and
  terminating charging of the pack battery when a charging current for charging the pack battery decreases to the charging termination current during the constant-voltage charging as the charging voltage reaches the supply voltage of the charger.
2. The pack battery charging method according to claim 1, further comprising:
  increasing the charging termination current as the degree of deterioration of the battery increases; and
  increasing the charging termination current as the supply voltage of the charger increases.
3. The pack battery charging method according to claim 1, further comprising:
  storing, by the pack battery, the charging termination current with respect to the degree of deterioration of the battery and the supply voltage of the charger in a look-up table; and
  determining the charging termination current based on the degree of deterioration of the battery and the supply voltage of the charger in accordance with storage of the look-up table.
4. The pack battery charging method according to claim 1, further comprising:
  storing, by the pack battery, a function for determining the charging termination current based on the degree of deterioration of the battery and the supply voltage of the charger; and
  determining the charging termination current based on the degree of deterioration of the battery and the supply voltage of the charger based on the function.
5. The pack battery charging method according to claim 1, wherein the pack battery incorporates a lithium ion secondary battery.
6. A pack battery connected to a charger and charged by switching from constant-current charging to constant-voltage charging, the pack battery comprising:
  a detection circuit that detects a charging voltage from the charger and a degree of deterioration of a battery;
  an arithmetic circuit that calculates a charging termination current for terminating charging of the pack battery during the constant-voltage charging based on a supply voltage of the charger and the degree of deterioration detected by the detection circuit; and
  a signal terminal that detects the charging termination current calculated by the arithmetic circuit and outputs a charging stop signal to the charger when a charging current for charging the pack battery decreases to the charging termination current during the constant-voltage charging as the charging voltage reaches the supply voltage of the charger.
7. The pack battery according to claim 6, wherein the arithmetic circuit includes a memory that stores a look-up table that determines the charging termination current based on the degree of deterioration of the battery and the supply voltage of the charger, and determines the charging termination current based on the degree of deterioration of the battery and the supply voltage of the charger based on the look-up table stored in the memory.
8. The pack battery according to claim 6, wherein the arithmetic circuit includes a memory that stores a function for determining the charging termination current based on the degree of deterioration of the battery and the supply voltage of the charger, and determines the charging termination current based on the degree of deterioration of the battery and the supply voltage of the charger based on the function stored in the memory.
9. The pack battery according to claim 6, wherein the pack battery incorporates a lithium ion secondary battery.
10. A power source device comprising:
  a charger; and
  a pack battery connected to the charger and charged by switching from constant-current charging to constant-voltage charging, wherein
  the pack battery includes:
  a detection circuit that detects a charging voltage from the charger and a degree of deterioration of a battery;
  an arithmetic circuit that calculates a charging termination current for terminating charging of the pack battery during the constant-voltage charging based on a supply voltage of the charger and the degree of deterioration detected by the detection circuit; and
  a signal terminal that detects the charging termination current calculated by the arithmetic circuit and outputs a charging stop signal to the charger when a charging current for charging the pack battery decreases to the charging termination current during the constant-voltage charging as the charging voltage reaches the supply voltage of the charger, and the charger includes a charging stop circuit that is connected to the signal terminal and stops charging of the pack battery with the charging stop signal input from the signal terminal.

11. The power source device according to claim 10, wherein the arithmetic circuit includes: a memory that stores a look-up table for determining the charging termination current based on the degree of deterioration of the battery and the supply voltage of the charger; and determines the charging termination current based on the degree of deterioration of the battery and the supply voltage of the charger based on the look-up table stored in the memory.

12. The power source device according to claim 10, wherein the arithmetic circuit includes a memory that stores a function for determining the charging termination current based on the degree of deterioration of the battery and the supply voltage of the charger, and determines the charging termination current based on the degree of deterioration of the battery and the supply voltage of the charger based on the function stored in the memory.

13. The power source device according to claim 10, wherein the pack battery incorporates a lithium ion secondary battery.

\* \* \* \* \*